US006962433B2

(12) United States Patent
Nichols et al.

(10) Patent No.: US 6,962,433 B2
(45) Date of Patent: Nov. 8, 2005

(54) MAGNETIC STIRRING APPARATUS HAVING LOW ROTATIONAL SPEEDS

(75) Inventors: Robert P. Nichols, Rocky Point, NY (US); John Halinski, Speonk, NY (US)

(73) Assignee: Scientific Industries, Inc., Bohemia, NY (US)

( * ) Notice: Subject to any disclaimer, the term of this patent is extended or adjusted under 35 U.S.C. 154(b) by 0 days.

(21) Appl. No.: 10/354,742

(22) Filed: Jan. 30, 2003

(65) Prior Publication Data

US 2004/0151065 A1 Aug. 5, 2004

(51) Int. Cl.[7] ................................. B01F 13/08
(52) U.S. Cl. ........................................ 366/274
(58) Field of Search ........................ 366/273, 274

(56) References Cited

U.S. PATENT DOCUMENTS

| | | | | | |
|---|---|---|---|---|---|
| 1,420,773 | A | * | 6/1922 | Stainbrook | 366/274 |
| 3,268,785 | A | * | 8/1966 | Gerber et al. | 318/8 |
| 3,445,741 | A | * | 5/1969 | Gerber | 318/696 |
| 3,693,941 | A | | 9/1972 | Suchy | 366/274 |
| 3,848,363 | A | * | 11/1974 | Lovness et al. | 366/273 |
| 4,080,663 | A | | 3/1978 | Wik | 366/274 |
| 4,131,370 | A | | 12/1978 | Lawrence et al. | 366/273 |
| 4,199,265 | A | | 4/1980 | Sanderson et al. | 366/274 |
| 4,209,259 | A | * | 6/1980 | Rains et al. | 366/273 |
| 4,568,195 | A | | 2/1986 | Herz et al. | 366/274 |
| 4,752,138 | A | * | 6/1988 | Rufer | 366/274 |
| 4,991,973 | A | * | 2/1991 | Maaz et al. | 366/274 |
| 5,087,868 | A | * | 2/1992 | Ishibashi et al. | 318/696 |
| 5,549,382 | A | * | 8/1996 | Correia et al. | 366/274 |
| 5,911,503 | A | * | 6/1999 | Braden et al. | 366/273 |
| 6,336,603 | B1 | | 1/2002 | Karkos, Jr. et al. | 241/101.2 |
| 6,467,944 | B2 | * | 10/2002 | Ugolini | 366/273 |
| 2001/0002892 | A1 | | 6/2001 | Karkos, Jr. et al. | 366/274 |

* cited by examiner

*Primary Examiner*—Tony G. Soohoo
(74) *Attorney, Agent, or Firm*—F. Chau & Associates LLC

(57) ABSTRACT

A magnetic stirring apparatus for achieving low rotational speeds is provided. The apparatus including a base for supporting a vessel containing a magnetic stir bar and a liquid to be stirred; a magnetic field generator for generating a rotating magnetic field to rotate the stir bar about an axis, the magnetic field generator including a plurality of coil pairs formed substantially in a circular manner, each coil of each pair being located diametrically opposite the other coil of the pair; a plurality of wedge-shaped tabs, each tab being coupled to a coil by a core, the wedge-shaped tabs forming a substantially circular plate; and a sine wave current generator for exciting each of the plurality of coil pairs by a predetermined phase shift resulting in the rotating magnetic field traveling along a circumference of the circular plate.

13 Claims, 4 Drawing Sheets

MAGNETIC STIRRING APPARATUS HAVING LOW ROTATIONAL SPEEDS

BACKGROUND OF THE INVENTION

1. Field of the Invention

The present invention relates generally to a magnetic stirring apparatus, and more particularly, to a magnetic stirring apparatus utilizing sine wave amplitude currents in a circular magnetic field generator to allow very low rotational speeds of a stirring bar, e.g., 1 rpm.

2. Description of the Related Art

A magnetic stirrer is a device which spins a small permanent bar magnet (usually Teflon coated and called a stir bar) placed inside a container or vessel of liquid, causing the liquid to be stirred.

Earlier prior art magnetic stirrers accomplished this by attaching a second permanent bar magnet to the top of a shaft of an electric motor, with the second magnet perpendicular to the shaft, and the axis of the motor shaft attached to the center of the magnet. When the second magnet on the motor shaft is placed in close proximity to the magnet in the vessel (usually by placing the motor in a non-magnetic housing with the second magnet at the top very close to the housing, and placing the vessel of liquid on top of the housing), the two magnets couple together, and the magnet in the vessel, i.e., stir bar, spins at the same rate as the second magnet attached to the motor. However, these stirrers tended to stall at low speeds due to friction and resistance in the bearings and wear out after many hours of use.

Later magnetic stirrers eliminated the motor and its associated moving parts by generating a rotating magnetic field beneath the vessel by providing at least one pair of parallelly disposed magnet coils supplied with respective phase shifted ac currents. The phase shifted ac currents resulted in alternating magnetic polarities of the coils that subjected the poles of the stir bar to alternating attracting and repelling forces, causing the stir bar to rotate about it axis.

Others have improved upon the coil method mentioned above by employing four or more coils of wire (usually wrapped around a ferrous post) arranged around a center point with tabs attached to the ferrous posts and pointing to the center point. Electric currents are applied to the coils to create magnetic fields above the coils and in the tabs to couple and rotate the stir bar. One such stirrer is disclosed in U.S. Pat. No. 4,199,265, entitled "MOTORLESS MAGNETICALLY COUPLED STIRRER" issued to Sanderson et al. on Apr. 22, 1980. One coil is energized to create a north magnetic pole in the tab connected to it, while the opposite coil is energized to create a south pole in the tab. The stir bar then aligns it's south pole over the north energized coil and it's north pole above the south energized coil. The current is then turned off, and (in the case of 4 coils) the other two coils are energized in this north/south manner. The stir bar then swings 90 degrees to align with the next set of coils. Current is then applied to the original set of coils, but reversed in direction, and the stir bar rotates 90 degrees more. This switching of coil current is continued, to keep the stir bar rotating. Effectively, a series of pulses is being sent to the magnetic coils for sequentially stepping a magnetic field in a rotary motion about the center point of the tabs. As long as the current is switched fast enough (approx 80–100 rpm), the stir bar moves smoothly, and the liquid is effectively stirred.

Slow speed magnetic stirring (1–80 rpm), is more difficult, and is usually achieved only by the above-mentioned method of attaching a magnet to a slow speed motor. Others have attempted to use the coil method, however, the magnetic attraction of the stir bar to the metal tabs causes very choppy motion at slow speeds, which is unacceptable, especially for biological applications.

SUMMARY OF THE INVENTION

A magnetic stirring apparatus is provided utilizing sine wave amplitude currents in a circular magnetic field generator to allow very low rotational speeds of a stir bar, e.g., 1 rpm.

According to an aspect of the present invention, a magnetic stirring apparatus is provided including a base for supporting a vessel containing a magnetic stir bar and a liquid to be stirred; a magnetic field generator for generating a rotating magnetic field to rotate the stir bar about an axis, the magnetic field generator including a plurality of coil pairs formed substantially in a circular manner, each coil of each pair being located diametrically opposite the other coil of the pair; a plurality of wedge-shaped tabs, each tab being coupled to a coil by a core, the wedge-shaped tabs forming a substantially circular plate; and a sine wave current generator for exciting each of the plurality of coil pairs by a predetermined phase shift resulting in the rotating magnetic field traveling along a circumference of the circular plate. The plurality of wedge-shaped tabs are arranged with a minimal gap between each tab.

According to another aspect of the present invention, the magnetic stirring apparatus further includes an insulating plate for insulating the circular plate from the plurality of coil pairs.

According to another aspect of the present invention, a first coil of at least one coil pair is coupled to a second coil by coupling together inner or outer coil wires of the first and second coil so when in operation the first coil of the pair will have the property of one magnetic pole, e.g., a north pole, while the second coil of the pair will have the property of an opposite magnetic pole, e.g., a south pole.

In yet another aspect of the present invention, the predetermined phase shift equals an angular displacement of the coil pairs.

According to a further aspect of the present invention, a method for controlling stirring of a liquid includes the steps of supporting a vessel including the liquid to be stirred; disposing a stir bar in the vessel; generating a magnetic field below the vessel coupling the magnetic field to the stir bar; concentrating the magnetic field in at least one magnetic tab of a plurality of tabs forming a circular plate arranged below the vessel; and rotating the concentrated magnetic field to rotate the stir bar.

BRIEF DESCRIPTION OF THE DRAWINGS

The above and other aspects, features, and advantages of the present invention will become more apparent in light of the following detailed description when taken in conjunction with the accompanying drawings in which.

DETAILED DESCRIPTION OF PREFERRED EMBODIMENTS

Preferred embodiments of the present invention will be described hereinbelow with reference to the accompanying drawings. In the following description, well-known functions or constructions are not described in detail to avoid obscuring the invention in unnecessary detail.

Figure 1:
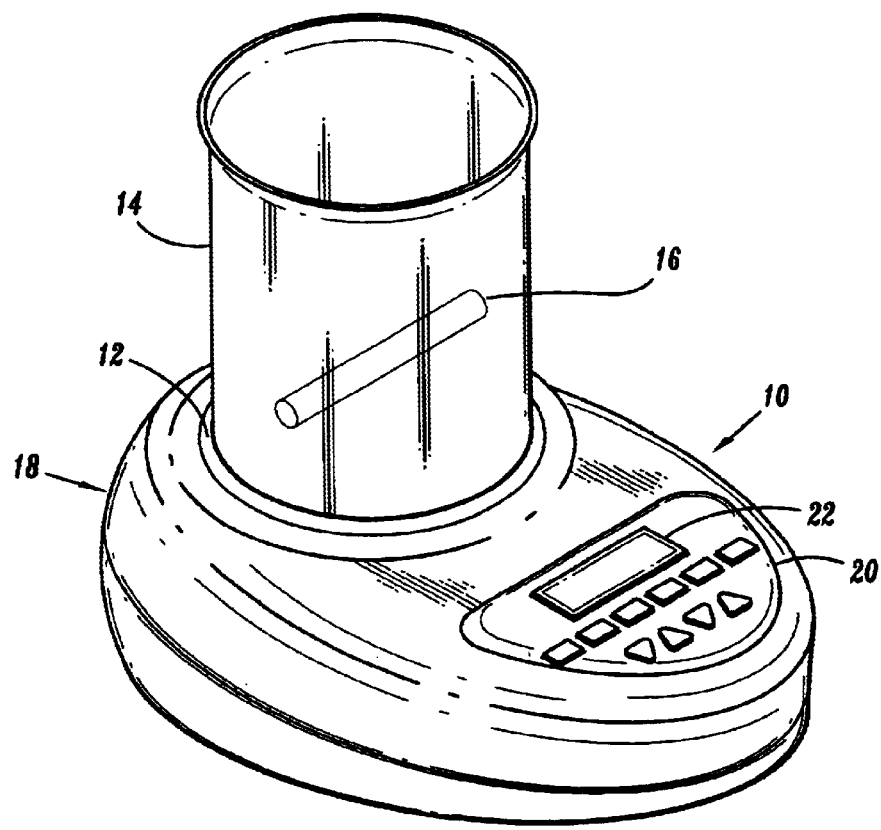
FIG. 1 is a prospective view of a magnetic stirring apparatus according to an embodiment of the present invention, wherein the apparatus is supporting a vessel containing a stir bar.

Referring to FIG. 1, a magnetic stirring apparatus 10 in accordance with the present invention is provided. The magnetic stirring apparatus 10 includes a base 12 for supporting a vessel 14 containing a liquid to be stirred and a magnetic field generator for generating a rotating magnetic field to rotate a stir bar 16. The magnetic field generator is enclosed in a housing 18 made from non-magnetic material, such as plastic or stainless steel, and the housing preferably forms the base 12. The vessel 14 may be a beaker, cuvette or any vessel suitable for holding a liquid and made from a material which will allow the rotating magnetic field generated by the apparatus 10 to be coupled to the stir bar 16 placed in the vessel 14. The stir bar 16 is a permanent magnet coated with a synthetic plastics material, such as Teflon™. Optionally, the apparatus will include a control panel 20 for setting a stirring speed and a display 22 for displaying the stirring speed.

Figure 2A:
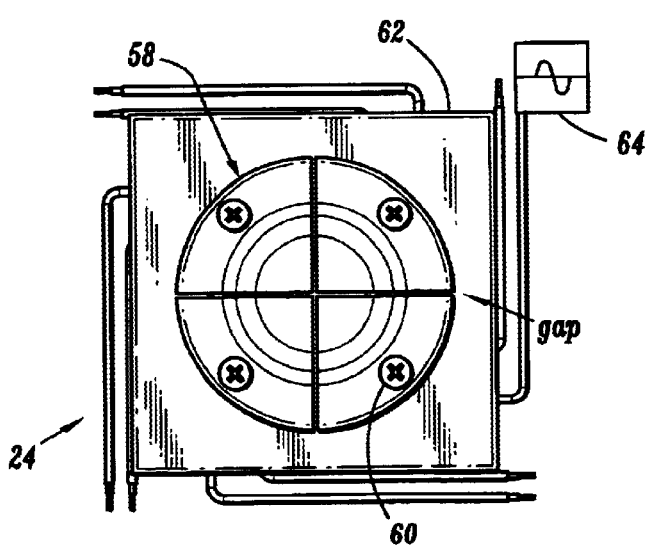
FIG. 2A is a top plan view of a magnetic field generator in accordance with an embodiment of the present invention.
Figure 2B:
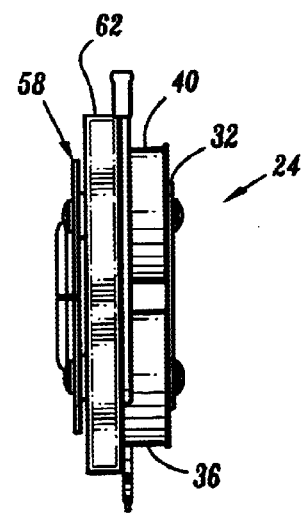
FIG. 2b is a side plan view of a magnetic field generator in accordance with an embodiment of the present invention.
Figure 3:
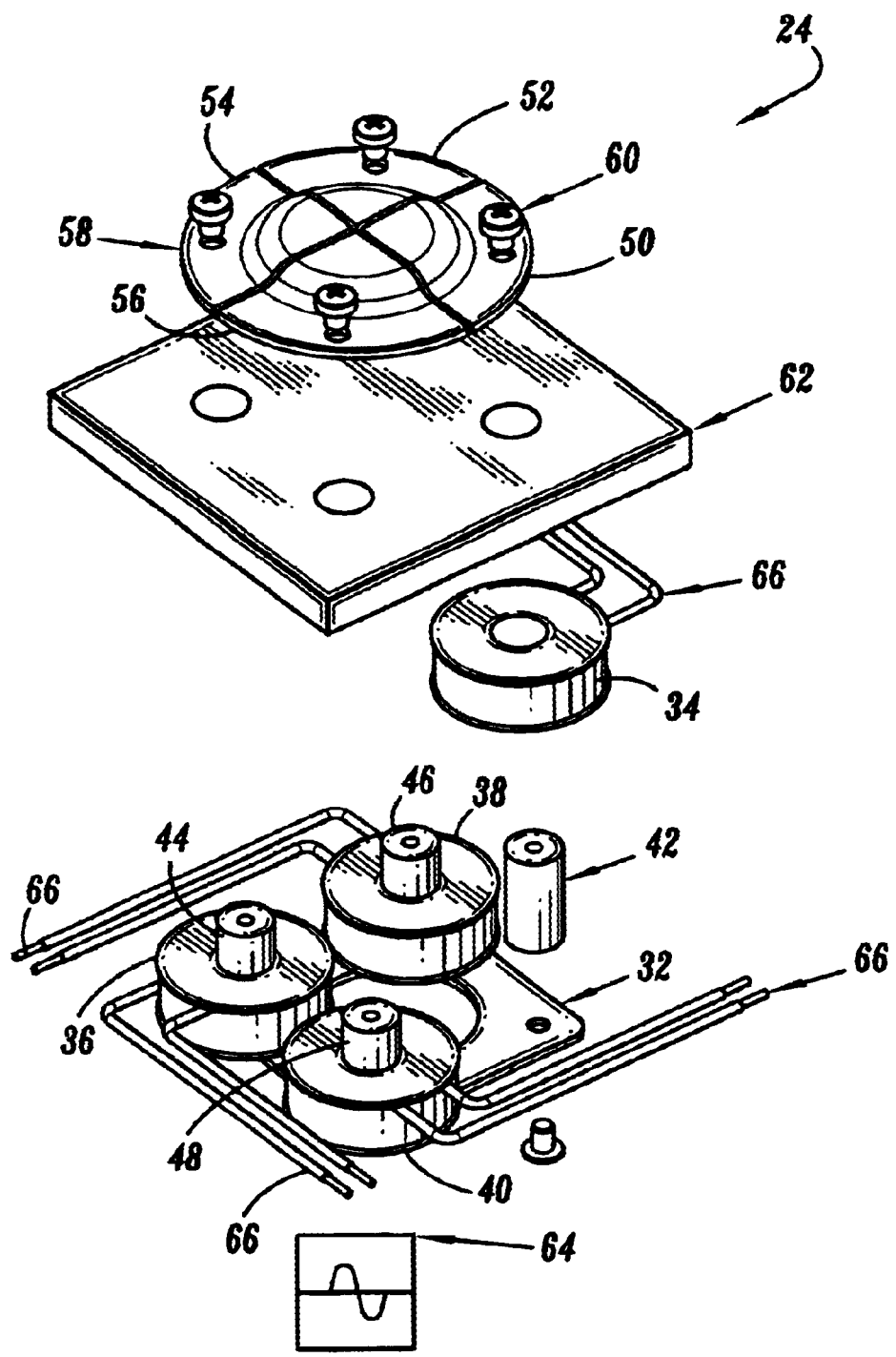
FIG. 3 is an exploded view of a magnetic field generator in accordance with an embodiment of the present invention.

Referring to FIGS. 2A and 2B, the magnetic field generator 24 is illustrated in a top plan view and side plan view, respectively, while FIG. 3 is an exploded view of the magnetic field generator showing various components of the magnetic field generator 24. The functions of each component and the assembling of the magnetic field generator will now be described in detail below.

The magnetic field generator 24 includes a generally rectangular base 32 upon which a plurality of coil pairs are located. Preferably, the base 32 is made from a magnetic ferrous material. Each coil 34, 36, 38, 40 includes a tightly wound spool of wire for passing electrical current. The coils 34, 36, 38, 40 are assembled on the base 32 in pairs diametrically opposite from each other. Each coil pair is coupled by connecting together either both inner or outer coil wires of opposing coils so when in operation one coil of the pair will have the property of one magnetic pole, e.g., a north pole, while the other coil of the pair will have the property of an opposite magnetic pole, e.g., a south pole, the details of which will be described below. For example, as shown in FIG. 3, four coils are illustrated with coils 34 and 36 being one pair and coils 38 and 40 being another pair. It is to be understood that any number of pairs of coils can be used as long as each coil of a pair is located diametrically opposite from each other.

Within the center of each coil 34, 36, 38, 40, a core 42, 44, 46, 48 is located for concentrating a magnetic field. As current is passed through each coil 34, 36, 38, 40, a magnetic field is generated in each core 42, 44, 46, 48, respectively. The location of the north and south pole for each core will depend on the direction of current flowing through each coil.

A plurality of wedge-shaped tabs 50, 52, 54, 56 are coupled to each core, via screws 60, and arranged to collectively form a substantially circular plate 58. As shown in FIG. 2A, the tabs are arranged with a minimal gap between each tab, the significance of which will be described below in relation to the operation of the stirring apparatus 10. The magnetic pole generated at an end of each core coupled to each tab will also be present at each tab. When assembled in the housing 18, the circular plate 58 will be located just below the base 12 of the housing 18 so that the magnetic field generated by the magnetic field generator 24 can couple to the stir bar 16 and rotate it about an axis, preferably in the center of the stir bar.

Optionally, an insulating plate 62 will be provided between the plurality of coil pairs and the circular plate to prevent heat being generated in the coils from being transferred to the liquid being stirred in the vessel 14.

Sine wave generator 64 for generating sine wave currents is coupled to each of the plurality of coil pairs via lead wires 66. Individual sine waves will be sent to each coil pair phase shifted by the angular displacement of the coil pairs. In the case of two pairs of coils 90° apart, as in the illustration shown in FIG. 3, the phase shift is 90°. As a further example, if three pairs of coils were provided and symmetrically arranged about a center point, the phase shift will be 60°.

Figure 4A:
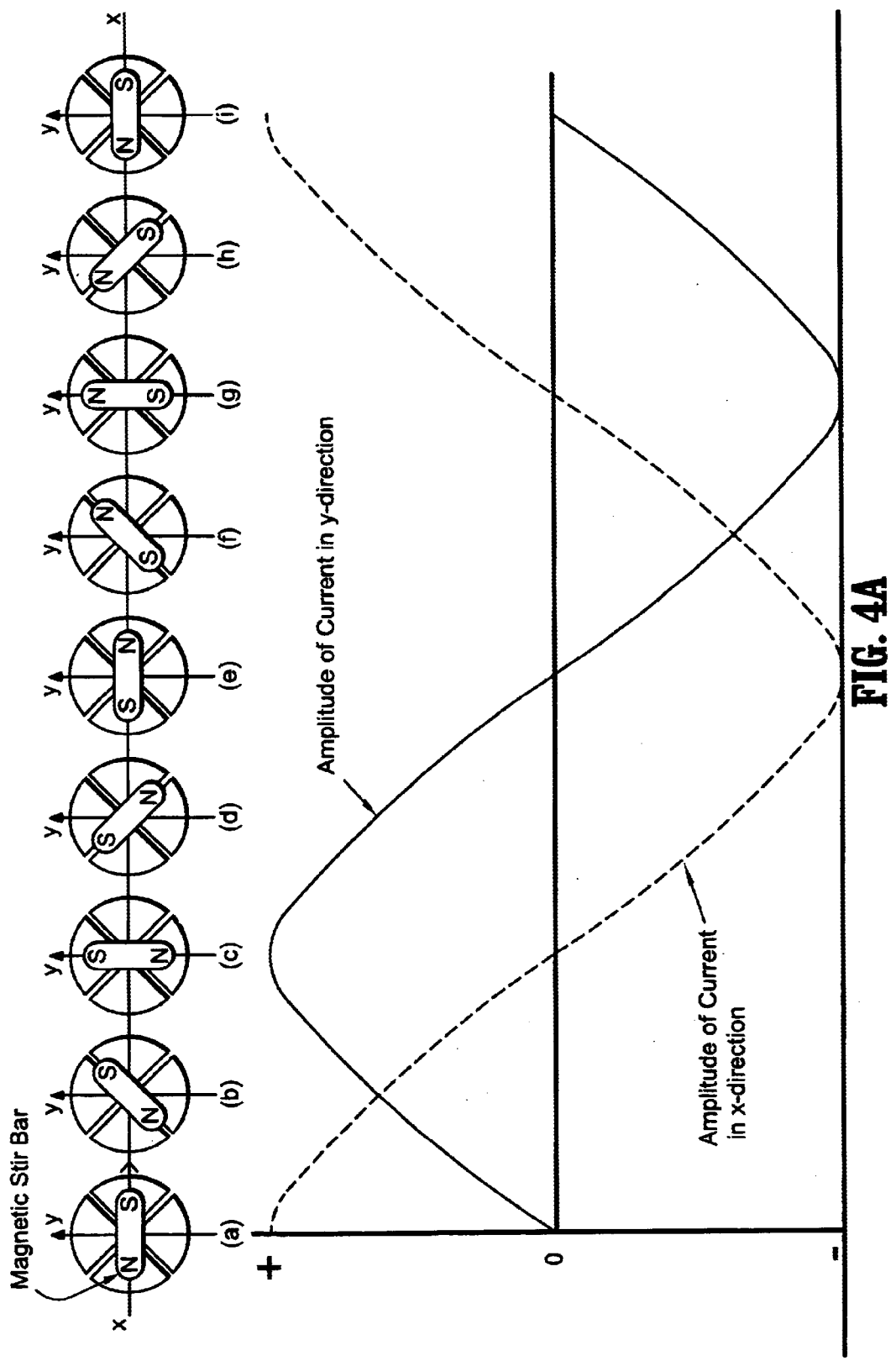
FIG. 4A is a graphical representation of the magnetic field rotating through the circular plate of the magnetic field generator in relation to the sine wave currents being feed to the magnetic field generator.
Figure 4B:
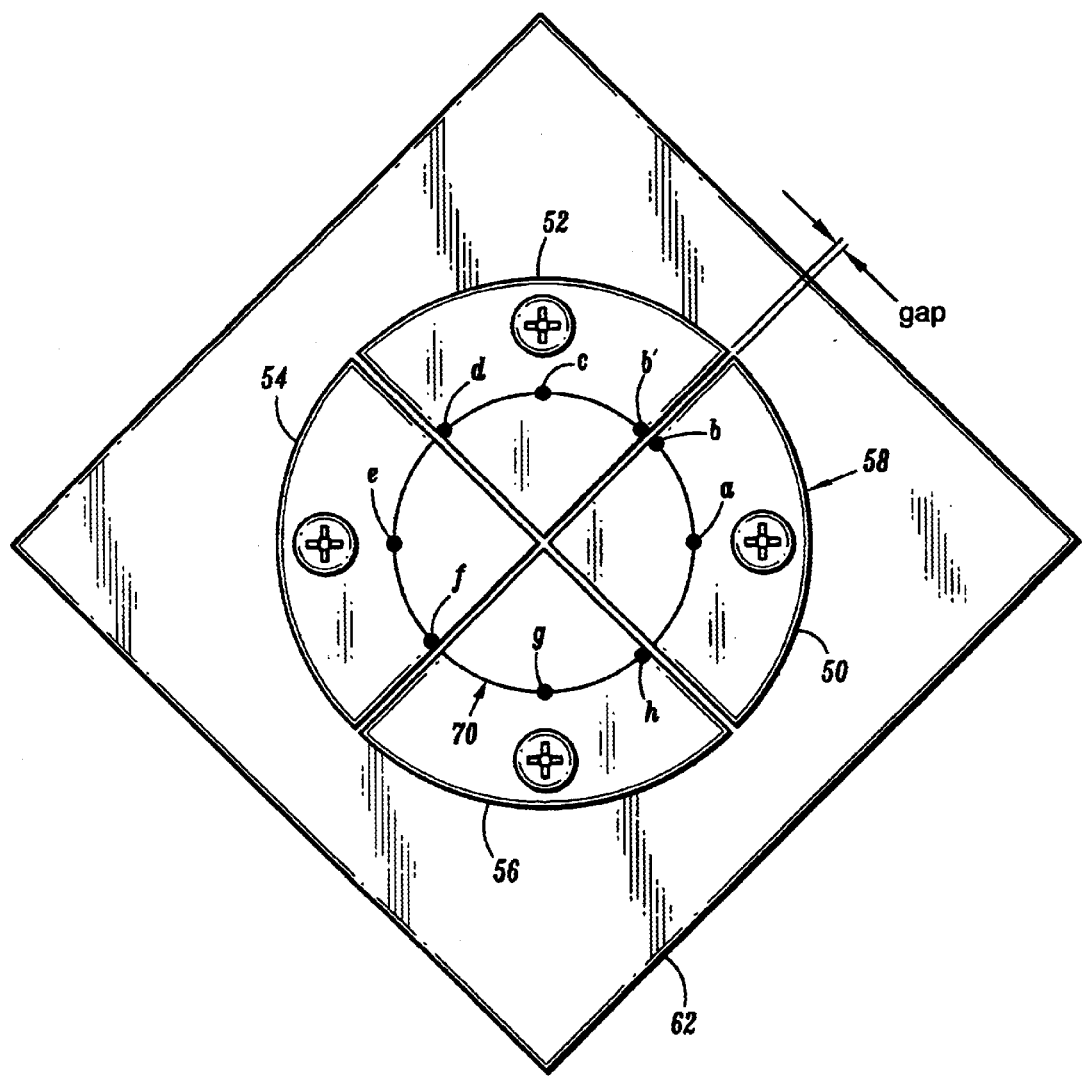
FIG. 4B illustrates the concentration points of the magnetic field along a circumference of the circular plate.

The generation of the magnetic field in relation to the sine wave currents will be described in relation to FIGS. 4A and 4B. In FIG. 4A, the upper portion illustrates the stir bar 16 rotating about the circular plate 58 comprising the four tabs through positions (a)–(i) and the lower portion illustrates two sine waves being applied to the coil pairs where the sine wave represented by a solid line is applied to one coil pair and the sine wave represented by a dashed line is applied to the other coil pair shifted by 90°. FIG. 4B illustrates the concentration points (a)–(i) of the magnetic field along a circumference 70 of the circular plate 58.

The magnetic field generated will be concentrated along a circumference 70 of the circular plate, the circumference being defined in terms of an x and y axis as shown in FIG. 4A. The solid sine wave represents an amplitude of current in the y-direction while the dashed sine wave represents an amplitude of current in the x-direction. As the two sine waves are being applied, their amplitudes will add resulting in the magnetic field being concentrated at a corresponding point on the x and y axis overlaying the circular plate. As the waves are generated over time, the concentration point of the magnetic field will rotate about a center point of the circular plate along circumference 70.

With continued reference to FIGS. 4A and 4B, at the initiation of the sine waves, the south pole of the stir bar is attracted to a concentrated north pole at position (a). As the sine wave currents are being applied, the concentrated north pole moves along a circumference of each tab according to the sum of the phase shifted sine waves. In this manner, the concentrated north pole can actually be at a plurality of points along an arc of the tab (as shown in FIG. 4B), as opposed to the prior art stirrers where each tab has a concentrated north pole at the center which causes a choppy motion at slow speeds. As opposed to jumping from north pole to north pole, the stir bar, as applied to the stirring apparatus of the present invention, follows the concentrated north pole along all points of each tab. Additionally, by having only a minimal gap between each tab, the stir bar will smoothly transition from one tab to the next since the stir bar will not have to jump a large distance to the next tab. For example, as shown in FIG. 4B, as the concentrated magnetic field moves along tab 50, it will reach position (b) and then be attached to the position (b') on tab 52.

A magnetic stirring apparatus achieving low rotational speeds have been described. By utilizing a substantially circular plate comprising wedge-shaped tabs, a magnetic field can be generated and concentrated along a circumference of the plate allowing for a smooth rotation of a stir bar at low speeds, e.g., 1–80 rpm.

While the invention has been shown and described with reference to certain preferred embodiments thereof, it will be understood by those skilled in the art that various changes in form and detail may be made therein without departing from the spirit and scope of the invention as defined by the appended claims.

What is claimed is:

1. A magnetic stirring apparatus comprising:
   a base for supporting a vessel containing a magnetic stir bar and a liquid to be stirred;
   a magnetic field generator for generating a rotating magnetic field to rotate the stir bar about an axis, the magnetic field generator including:
   a plurality of coil pairs formed substantially in a circular manner, each coil of each pair being located diametrically opposite the other coil of the pair;
   a plurality of wedge-shaped tabs, each tab being coupled to a coil by a core, the wedge-shaped tabs forming a substantially circular plate;
   a sine wave current generator for exciting each of the plurality of coil pairs by a predetermined phase shift resulting in the rotating magnetic field traveling along a circumference of the circular plate; and
   an insulating plate for insulating the circular plate from the plurality of coil pairs.

2. The magnetic stirring apparatus as in claim 1, wherein the plurality of wedge-shaped tabs are arranged with a minimal gap between each tab.

3. The magnetic stirring apparatus as in claim 1, where a first coil of at least one coil pair is coupled to a second coil by coupling together inner coil wires of the first and second coil so when in operation the first coil of the pair will have the property of one magnetic pole, while the second coil of the pair will have the property of an opposite magnetic pole.

4. The magnetic stirring apparatus as in claim 1, where a first coil of at least one coil pair is coupled to a second coil by coupling together outer coil wires of the first and second coil so when in operation the first coil of the pair will have the property of one magnetic pole, while the second coil of the pair will have the property of an opposite magnetic pole.

5. The magnetic stirring apparatus of claim 1, wherein the predetermined phase shift equals an angular displacement of the coil pairs.

6. The magnetic stirring apparatus as in claim 1, wherein the magnetic field generator and the sine wave current generator are disposed in a housing, the housing forming the base.

7. A method for controlling stirring of a liquid, the method comprising the steps of:
   supporting a vessel including the liquid to be stirred;
   disposing a stir bar in the vessel;
   generating a magnetic field below the vessel coupling the magnetic field to the stir bar;
   concentrating the magnetic field in at least one magnetic tab of a plurality of tabs forming a circular plate arranged below the vessel;
   rotating the concentrated magnetic field to rotate the stir bar, wherein the magnetic field is generated by a magnetic field generator including a plurality of coil pairs, and generating the magnetic field includes applying a first sine wave current to a first coil pair of the plurality of coil pairs and applying a second sine wave current out of phase with the first sine wave current to a second coil pair of the plurality of coil pairs; and
   insulating, with an insulating plate, the circular plate from the plurality of coil pairs.

8. The method as in claim 7, wherein the plurality of coil pairs are formed substantially in a circular manner;
   each coil of each pair is located diametrically opposite the other coil of the pair; and
   the magnetic field generator includes the plurality of tabs, each tab being coupled to a coil by a core, the tabs being wedge-shaped for forming the substantially circular plate.

9. The method as in claim 8, wherein the magnetic field generator further includes a sine wave current generator for generating the first and second sine wave currents for exciting each of the plurality of coil pairs by a predetermined phase shift resulting in the rotating magnetic field traveling along a circumference of the circular plate.

10. The method as in claim 9, wherein the predetermined phase shift equals an angular displacement of the coil pairs.

11. A magnetic stirring apparatus comprising:
    a supporting means for supporting a vessel containing a magnetic stir bar and a liquid to be stirred;
    a magnetic field generating means for generating a rotating magnetic field to rotate the stir bar about an axis, the magnetic field generating means including:
    a plurality of coil pairs formed substantially in a circular manner, each coil of each pair being located diametrically opposite the other coil of the pair;
    a plurality of wedge-shaped tabs, each tab being coupled to a coil by a core, the wedge-shaped tabs forming a substantially circular plate; and
    a current generating means for exciting each of the plurality of coil pairs by a predetermined phase shift resulting in the rotating magnetic field traveling along a circumference of the circular plate, wherein a first coil of at least one coil pair is coupled to a second coil by coupling together inner coil wires of the first and second coil so when in operation the first coil of the pair will have the property of one magnetic pole, while the second coil of the pair will have the property of an opposite magnetic pole.

12. A magnetic stirring apparatus comprising:
    a base for supporting a vessel containing a magnetic stir bar and a liquid to be stirred;
    a magnetic field generator for generating a rotating magnetic field to rotate the stir bar about an axis, the magnetic field generator including:
    a plurality of coil pairs formed substantially in a circular manner, each coil for each pair being located diametrically opposite the other coil of the pair;
    a plurality of wedge-shaped tabs, each tab being coupled to a coil by a core, the wedge-shaped tabs forming a substantially circular plate; and
    a sine wave current generator for exciting each of the plurality of coil pairs by a predetermined phase shift resulting in the rotating magnetic field traveling along a circumference of the circular plate, wherein a first coil of at least one coil pair is coupled to a second coil by coupling together outer coil wires of the first and second coil so when in operation the first coil of the pair will have the property of one magnetic pole, while the second coil of the pair will have the property of an opposite magnetic pole.

13. A magnetic stirring apparatus comprising:

a base for supporting a vessel containing a magnetic stir bar and a liquid to be stirred;

a magnetic field generator for generating a rotating magnetic field to rotate the stir bar about an axis, the magnetic field generator including:

a plurality of coil pairs formed substantially in a circular manner, each coil for each pair being located diametrically opposite the other coil of the pair;

a plurality of wedge-shaped tabs, each tab being coupled to a coil by a core, the wedge-shaped tabs forming a substantially circular plate;

a sine wave current generator for exciting each of the plurality of coil pairs by a predetermined phase shift resulting in the rotating magnetic field traveling along a circumference of the circular plate; and an insulating plate positioned between the circular plate and the plurality of coil pairs for insulating the circular plate from heat generated in the plurality of coil pairs.

* * * * *